July 11, 1939.   E. H. LAND   2,165,973
LIGHT-POLARIZING BODY
Filed June 24, 1936
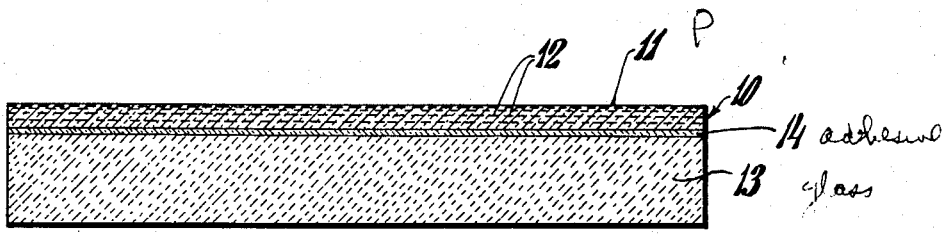
Edwin H. Land
INVENTOR
BY Brown & Jones
ATTORNEYS Patented July 11, 1939

2,165,973

UNITED STATES PATENT OFFICE 2,165,973

LIGHT-POLARIZING BODY

Edwin H. Land, Wellesley Farms, Mass., assignor, by mesne assignments, to Polaroid Corporation, Dover, Del., a corporation of Delaware Application June 24, 1936, Serial No. 86,908

4 Claims. (Cl. 88—65)

This invention relates to a new and improved light-polarizing body. This application is a continuation in part of my copending application Serial No. 434,833, filed March 10, 1930, for Refracting polarizing body and process of making the same.

The invention has for its object generally an improved polarizing body of the character described which accomplishes polarization of transmitted light efficiently and which may be readily and conveniently manufactured.

A further object of the invention is to provide a polarizing body comprising a transparent suspending medium having polarizing particles dispersed therethrough and oriented therein with their polarizing axes in substantial parallelism.

A still further object of the invention is to provide such a polarizing body wherein the dispersed polarizing particles comprise but a small percentage, for example, about 5%, of the total volume of the set suspension, and wherein the suspending medium surrounds, separates, and is distributed throughout the interstices between the light-polarizing particles within the suspension.

A still further object of the invention is to provide such a polarizing body wherein a plurality of layers of light-polarizing particles are employed, the particles in one layer being adapted to overlie interstices between the particles of another layer, whereby polarization to a substantially uniform degree of a transmitted beam of light is effected, even though a single layer of suspended particles might not be adapted to so polarize a transmitted beam.

A still further object of the invention is to provide a layer of oriented light-polarizing particles on a transparent supporting plate, for example a plate of glass, and to provide a protective medium covering the particles and intermingled therewith so as to penetrate the interstices between the particles in the particle layer.

A still further object of the invention is to provide a sheet-like light-polarizing element of such a character that any plane traversing the sheet and parallel to a face thereof will comprise both crystalline light-polarizing material and suspending or protective or encompassing medium.

A still further object of the invention is to provide such a light-polarizing material wherein the crystalline suspended particles and the interstices between adjacent particles are microscopic in size.

A still further object of the invention is to provide such a polarizing body wherein the polarizing particles employed contain iodine.

Other objects of the invention will in part be obvious and will in part appear hereinafter.

The invention accordingly comprises a product possessing the features, properties, and the relation of components which will be exemplified in the product hereinafter described and the scope of the application of which will be indicated in the claims.

For a fuller understanding of the nature and objects of the invention reference should be had to the accompanying drawing, which shows in greatly enlarged and somewhat diagrammatic manner a cross-section of an article embodying one form of the invention.

In the practice of the present invention a polarizing body is preferably made in the form of a sheet or film by pouring, stretching, extruding, rolling, or otherwise extending a relatively viscous medium which contains a large mass of small, light-polarizing bodies, such for example as transparent polarizing crystals of herapathite dispersed throughout the medium, which, when set, retains the polarizing particles in proper polarizing orientation. By pouring or extruding or rolling or stretching, or otherwise extending a viscous medium of this character, it is seen that the crystals dispersed therein and which are preferably asymmetric in contour, are subjected to a mechanical field of force which tends to orient the crystals with their needle axes parallel. The longest axis of each crystal will tend to orient substantially parallel to the direction of extension of the medium.

While herapathite has been mentioned as a suitable material for use as the suspended crystalline particles, it is to be understood that any light-polarizing material may be employed. Herapathite or sulfate of iodoquinine has been found to be readily adapted for the purposes of the invention, inasmuch as small, needle-like crystals of the material may be rapidly and cheaply produced and introduced readily into the desired suspending medium. So also similar compounds comprising other substances of the group comprising quinine, quinidine, cinchonine and cinchonidine, in combination with iodine compounds, may be employed. Preferably the crystalline material employed should contain iodine.

Where the crystals employed are minute, i. e., where they have one dimension smaller than the wave length of the light transmitted by the polarizing body, the set suspension of the oriented crystalline material in the light-transmitting medium will be found to give a minimum scattering to the transmitted beam. A preferred embodiment of the invention contemplates the use of minute, substantially sub-microscopic crystals having one dimension, for example, in the neighborhood of 400 millimicrons or less and being needle-shaped. A microscopic examination of a set suspension of such crystalline material shows it to be homogeneous and clear, while substantially no scattering of the transmitted light is detected.

Suitable suspending media may comprise plastics, such for example as nitrocellulose, cellulose acetate, or other cellulosic media, or such synthetic plastics as vinyl acetate and the like. The medium should preferably comprise a material which is inert with respect to the suspended crystalline polarizing material.

If orientation of the polarizing particles is to be accomplished by pouring, the suspending medium should preferably have substantially the maximum viscosity compatible with flow. Under such circumstances smooth ribbons or sheets or films of the material may be obtained free from air bubbles.

In my issued Patent No. 2,041,138, for process of forming improved light-polarizing bodies, a process of forming polarizing bodies by flowing or pouring the suspending medium carrying the crystalline material is disclosed and claimed.

In my issued Patent No. 2,011,553, a process of forming a light-polarizing body by subjecting the suspension of the polarizing crystals in a suspending medium to stretch is described and claimed.

In my issued Patent No. 1,989,371, a process of forming a polarizing body by extruding the suspension of polarizing crystals in a suspending medium is shown and described. Any of these processes may be satisfactorily employed in connection with the production of the polarizing body of the present invention.

One example of the present invention follows:

A jelly-like mass containing herapathite crystalline material is added to a suitable cellulosic solution, for example, a solution of nitrocellulose or of cellulose acetate. In my issued Patent No. 1,951,664, for colloidal suspensions and the process of making the same, a process is disclosed for the manufacture of minute, colloidal-like crystals of herapathite. 1.5 grams of quinine-bisulfate may be dissolved in 50 c. c. of methyl alcohol. The solution may then be brought to a boil and stirred, preferably with an iron stirring rod. The solution is then removed from the heat and 0.525 gram of iodine as a 20% solution in alcohol are added. The mixture is then stirred until a gel forms and the mass is cooled. The stirring precipitates the periodide of quinine sulfate (herapathite) as a jelly of colloidal-like crystals of herapathite in the form of needle-like or fibre-like crystals suspended in methyl alcohol. Where nitrocellulose is employed as the suspending medium, it may be suitably prepared by dissolving a quantity of, for example one fourth second, cotton in as little solvent as will dissolve it. Suitable solvents are ethyl acetate or butyl acetate, or mixtures thereof. The solution of nitrocellulose is highly adhesive, and when the mass of herapathite is added disrupts the plates into which the needle crystals of herapathite tend to gather. As a consequence one thus produces a relatively highly dispersed mass of minute, asymmetric particles in a viscous menstruum of nitrocellulose, which when poured or otherwise subjected to an extending force forms a sheet-like ribbon containing crystals which are oriented so as to have their polarizing axes in substantial parallelism and which when set has the polarizing properties desired.

Where cellulose acetate is employed as the suspending medium, the suspension of colloidal-like crystals of herapathite may be similarly prepared in solvents for cellulose acetate which are substantially non-solvents of herapathite. After the crystals have been thoroughly mixed into the solution of cellulose acetate the mass may be filtered and extruded. Sheet-like polarizing elements embodying one form of the invention are thus formed, with cellulose acetate as the suspending medium.

It will be obvious that other methods may be employed for forming the crystalline material and for incorporating it into any suitable suspending medium.

As has been pointed out, the polarizing body of the present invention may preferably be made in the form of a relatively thin sheet or film comprising the suspending medium having the minute polarizing particles oriented and dispersed therein. If desired the polarizing body may itself be permanently or detachably affixed to a suitable support, preferably transparent, as for example to a plate of glass or a sheet of Celluloid. Such a support or a plurality of such supports may be desirable under certain conditions where it is found that the polarizing body may itself require some form of protection, or where a smooth, rigid sheet of polarizing material may be desired.

In the drawing such a construction is shown. 10 represents the polarizing body, which may comprise a sheet of a transparent medium 11, such, for example, as a set sheet of cellulose acetate containing properly oriented, minute, polarizing particles 12 of the desired character. As shown this sheet or film is superimposed or supported upon any ordinary transparent body 13, which may be glass. It may be desirable to interpose between the polarizing body and the supporting plate a transparent adhesive 14, which may comprise preferably a thin layer of fluid Celluloid, dibutyl phthalate, or other colorless oily ester, or it may comprise other adhesives, such for example as the material sold under the trade name "Vinylite," suitably plasticized with a non-solvent of the suspending medium and the crystalline polarizing material. If desired this layer 14 may act merely as a fluid support upon which the light-polarizing film may be flowed. Under such conditions the layer 14 may act to prevent the entrapment of bubbles within the polarizing body, and it may act also to relieve unequal stresses therein. It will be obvious that where the layer 14 is employed merely as a fluid support the polarizing body, when dry, may be peeled therefrom, whereas if the layer 14 be employed as an adhesive, the polarizing body may be joined permanently to the transparent supporting plate.

Preferably in the polarizing body itself, the separate polarizing particles will be dispersed throughout the medium, which will fill the interstices therebetween. It may be proper under such circumstances to consider the particles and the suspending medium intermingled to form the polarizing body. As shown by the drawing, in any plane traversing the polarizing sheet and parallel to the face thereof, there will be found a layer of substantially oriented light-polarizing crystals with interstices therebetween.

The polarizing body may be considered as comprising a plurality of such overlying layers, the crystals in one layer being positioned so as to overlie the interstices between the crystals in another layer. The polarizing body will act to polarize to a uniform degree a transmitted beam of light, for there will be no interstices extending through the polarizing body as a whole, and the beam of light may traverse several of the crystalline elements irrespective of the place at which it traverses the polarizing body. Actually the crystals and the interstices between the crystals are minute and may be spoken of as microscopic in size.

Throughout the specification and claims reference to a set or hardened suspending medium will be understood as implying merely such a change in the characteristics of the medium as will prevent movement of the particles therein from their oriented positions because of molecular bombardment of the surrounding medium.

It will be further understood that each of the media which may be employed in connection with the present invention as the suspending medium may have its preferred solvent, which, however, should be a non-solvent for the polarizing particles carried by the medium.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and useful and desire to secure as Letters Patent, is:

1. In combination, a supporting element, a suspension of needle-like areas of herapathite in a cellulosic medium, said areas being oriented with their polarizing axes in substantial parallelism, said medium encompassing said areas and being adhesively affixed to said supporting element, said areas being distributed throughout said medium in the form of a plurality of discontinuous layers, the areas of one layer overlying the interstices between areas of an adjacent layer.

2. In combination, a supporting element, a suspension of needle-like areas of herapathite in a light-transmitting medium, said areas being oriented with their polarizing axes in substantial parallelism, said medium encompassing said areas and being adhesively affixed to said supporting element, said areas being distributed throughout said medium in the form of a plurality of discontinuous layers, the areas of one layer overlying the interstices between areas of an adjacent layer.

3. In combination, a supporting element, a suspension of needle-like light-polarizing areas in a transparent suspending medium, said areas being oriented with their polarizing axes in substantial parallelism, said medium encompassing said areas and being affixed to said supporting element, said areas being distributed throughout said medium in the form of a plurality of discontinuous layers, the areas of one layer overlying the interstices between areas of an adjacent layer.

4. In combination, a supporting element, a suspension of asymmetric elongated polarizing particles in a light-transmitting medium, the particles being adapted to polarize transmitted light by differential absorption of the components thereof, the particles being distributed throughout said medium with their polarizing axes oriented to substantial parallelism and with their long axes oriented to substantial parallelism, said medium encompassing said particles and being affixed to said supporting element, said particles being distributed throughout said medium in the form of a plurality of discontinuous layers, the areas of one layer overlying the interstices between areas of an adjacent layer.

EDWIN H. LAND.